United States Patent
Fawaz et al.

(10) Patent No.: US 10,343,695 B2
(45) Date of Patent: Jul. 9, 2019

(54) CONTROLLING VEHICLE FUNCTIONALITY BASED ON GEOPOLITICAL REGION

(71) Applicant: GENERAL MOTORS LLC, Detroit, MI (US)

(72) Inventors: Ali H. Fawaz, Dearborn Heights, MI (US); Alexander X. Cermak, Grosse Pointe Woods, MI (US); Esteban Camacho, Belleville, MI (US); Ryan Olejniczak, Clinton Township, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 15/812,414

(22) Filed: Nov. 14, 2017

(65) Prior Publication Data

US 2019/0143996 A1    May 16, 2019

(51) Int. Cl.
| | |
|---|---|
| *B60W 50/00* | (2006.01) |
| *G01S 19/13* | (2010.01) |
| *B60R 25/20* | (2013.01) |

(52) U.S. Cl.
CPC ............. *B60W 50/00* (2013.01); *G01S 19/13* (2013.01); *B60R 25/20* (2013.01); *B60W 2550/00* (2013.01)

(58) Field of Classification Search
USPC .......................................................... 701/36
See application file for complete search history.

(56) References Cited

U.S. PATENT DOCUMENTS

| | | | | |
|---|---|---|---|---|
| 2004/0243368 | A1* | 12/2004 | Hiemer ................ | B60W 40/02 703/8 |
| 2005/0043872 | A1* | 2/2005 | Heyn .................... | G01C 21/26 701/36 |
| 2006/0009890 | A1* | 1/2006 | Meister ................ | B60R 16/037 701/36 |
| 2012/0250517 | A1* | 10/2012 | Saarimaki ......... | H04M 1/72569 370/241 |
| 2012/0324482 | A1* | 12/2012 | Park ...................... | G06F 9/541 719/328 |
| 2013/0145360 | A1* | 6/2013 | Ricci ..................... | H04W 4/90 717/174 |
| 2016/0278087 | A1* | 9/2016 | Thanayankizil ...... | H04W 64/00 |

* cited by examiner

*Primary Examiner* — Tyler D Paige
(74) *Attorney, Agent, or Firm* — Reising Ethington P.C.; David Willoughby (57) ABSTRACT

A method and system of controlling vehicle functionality based on a geopolitical region of the vehicle, the method including the steps of: monitoring a geographical location of the vehicle; resolving the geographical location of the vehicle to a geopolitical region in which the vehicle is located; obtaining permitted vehicle function information for the geopolitical region in which the vehicle is located; and disabling or enabling one or more vehicle functions based on the obtained permitted vehicle function information.

10 Claims, 3 Drawing Sheets

CONTROLLING VEHICLE FUNCTIONALITY BASED ON GEOPOLITICAL REGION

INTRODUCTION

The disclosure relates to controlling the functionality of a vehicle according to the geopolitical region in which the vehicle is located.

To reduce costs of vehicle manufacture, vehicles can be manufactured according to global specifications. The original equipment manufacturers of vehicles are striving to maximize the savings in the design, development, and manufacture of vehicles by making as many of the parts of a vehicle common throughout the world. However, one problem associated with globalization is that it is quite possible that a vehicle will be transported and used in a region of the world that has laws that are different than those of other regions. And while the use of certain technologies is acceptable in one geographic region, the use of that technology in another geographic region may violate the laws or regulations of that region. In one such example, a first geographic region may allow certain vehicle functions to be remotely controlled whereas a second geographic region may disallow the certain vehicle functions to be controlled or carried out.

SUMMARY

According to one aspect of the invention, there is provided a method of controlling vehicle functionality based on a geopolitical region of the vehicle, the method including the steps of: monitoring a geographical location of the vehicle; resolving the geographical location of the vehicle to a geopolitical region in which the vehicle is located; obtaining permitted vehicle function information for the geopolitical region in which the vehicle is located; and disabling or enabling one or more vehicle functions based on the obtained permitted vehicle function information.

According to various embodiments, this method may further include any one of the following features or any technically-feasible combination of these features:
- the method is carried out by a remote facility and wherein the remote facility is configured to receive the geographical location from the vehicle;
- the steps of: receiving a vehicle function request from a client device at the remote facility; obtaining a requested vehicle function from the vehicle function request; determining whether the requested vehicle function is disabled or enabled for the vehicle; and when the requested vehicle function is enabled, then sending the requested vehicle function to the vehicle;
- the steps of: determining not to send the requested vehicle function to the vehicle; and notifying the client device that the requested vehicle function is not going to be and/or was not carried out;
- the one or more vehicle functions are disabled or enabled by sending a disable/enable vehicle function message to the vehicle, wherein the disable/enable vehicle function message specifies at least one vehicle function that is to be disabled or enabled;
- the permitted vehicle function information is obtained from a geopolitical region information database that includes geopolitical region information associated with a set of vehicle functions, and wherein the geopolitical region information includes a geopolitical region identifier and geopolitical region boundary information that identifies the geographical boundaries of the geopolitical region;
- the resolving step further includes obtaining the geopolitical region boundary information from the geopolitical region information database and using the geopolitical region boundary information along with the geographical location to determine the geopolitical region in which the vehicle is located; and/or
- the method is carried out by the vehicle and wherein the resolving step includes sending the geographical location to a remote server and, subsequently, receiving a geopolitical region resolve message that includes the geopolitical region in which the vehicle is located.

According to another aspect of the invention, there is provided a method of controlling vehicle functionality based on a geopolitical region of the vehicle, the method including the steps of: determining a geographical location of the vehicle, wherein the geographical location corresponds to a geopolitical region; receiving a vehicle function request to perform a requested vehicle function; determining whether the vehicle function is permitted or not permitted to be carried out in the geopolitical region in which the vehicle is located by determining whether the requested vehicle function corresponds to one of the vehicle functions included in the set of vehicle functions; and performing the vehicle function when it is determined that the vehicle function is permitted to be carried out in the geopolitical region in which the vehicle is located.

According to various embodiments, this method may further include any one of the following features or any technically-feasible combination of these features:
- the geopolitical region includes laws or regulations that, at least in effect, prohibit the carrying out of at least one vehicle function;
- the vehicle function request is sent from a client device and wherein the requested vehicle function is a vehicle ignition start function;
- the vehicle includes geopolitical region information that is stored in a memory device included in the vehicle, wherein the geopolitical region information includes geopolitical region boundary information that is associated with the set of vehicle functions;
- the geographical location is determined through receiving and processing global navigation satellite system (GNSS) signals from a plurality of GNSS satellites at a GNSS module included in the vehicle; and/or
- the vehicle function request includes a plurality of requested vehicle functions, wherein the vehicle function is a first one of the plurality of vehicle functions, and wherein the performing step is prevented from being carried out when it is determined that: (i) a second one of the plurality of requested vehicle functions is not permitted to be carried out in the geopolitical region in which the vehicle is located; and (ii) carrying out of the second vehicle function causes the vehicle to enter a vehicle state that is either required or desired as a precondition for carrying out the first vehicle function.

According to yet another aspect of the invention, there is provided a method of controlling vehicle functionality based on a geopolitical region of the vehicle, the method including the steps of: determining a geographical location of the vehicle, wherein the geographical location of the vehicle is determined through using a global navigation satellite system (GNSS) module that is included in vehicle electronics of the vehicle, and wherein the GNSS module is configured to receive a plurality of GNSS signals from a constellation of GNSS satellites and to determine geographical coordinates based on the plurality of received GNSS signals; resolving a present geographical location of the vehicle to a geopolitical region in which the vehicle is located; obtaining permitted vehicle function information for the present geopolitical region of the vehicle; receiving a vehicle function request to perform a requested vehicle function or an indication that an imminent vehicle function is to be performed; determining whether the requested or imminent vehicle function is permitted to be carried out in the present geopolitical region; when it is determined that the requested or imminent vehicle function is permitted to be carried out in the present geopolitical region, performing the particular vehicle function; and when it is determined that the requested or imminent vehicle function is not permitted to be carried out in the present geopolitical region, then denying the vehicle function request or preventing the imminent vehicle function from being performed.

According to various embodiments, this method may further include any one of the following features or any technically-feasible combination of these features:

- the present geopolitical region is resolved by: (i) obtaining geopolitical region boundary information that comprises a set of coordinates representing a geographical boundary of a first geopolitical region; (ii) using the obtained geopolitical region boundary information and the geographical coordinates of the vehicle in conjunction with a point-in-polygon algorithm or method to determine whether the vehicle is located within the first geopolitical region; and (iii) when it is determined that the vehicle is not located within the first geopolitical region, then carrying out (i)-(ii) until it is determined that the vehicle is located within the first geopolitical region;
- the indication of the imminent vehicle function is based on a particular vehicle state that indicates the imminent vehicle function is to be or is likely to be carried out;
- the vehicle function request is received from a client device that includes a vehicle-device application that permits a user of the vehicle-device application to control various functions of the vehicle, and wherein the requested vehicle function is a vehicle ignition start function;
- the resolving step includes automatically sending the geographical location to a remote facility and wherein the remote facility is configured to send geopolitical region information including an indication of the present geopolitical region; and/or
- the geographical location is automatically sent to the remote facility regardless whether the vehicle is located within the same geopolitical region as the remote facility.

BRIEF DESCRIPTION OF THE DRAWINGS

Exemplary embodiments will hereinafter be described in conjunction with the appended drawings, wherein like designations denote like elements, and wherein.

DETAILED DESCRIPTION

The system and methods below allow a vehicle to automatically enable or disable a set of vehicle functions based on whether certain vehicle functionality is permitted in the geopolitical region in which the vehicle is located. Various countries in which vehicles may ultimately be sold or operated can include laws and/or regulations that permit or disallow certain vehicle functionality. Since the laws and/or regulations of countries may differ, a first country, state, or internationally-recognized geopolitical region (each a "geopolitical region") may permit a set of vehicle functionality that a second geopolitical region disallows. Moreover, at least in some scenarios, certain geopolitical regions may be close in proximity and/or may include complex or numerous regulations relating to vehicles or vehicle functionality. Thus, by configuring the vehicle with geopolitical region information (e.g., a lookup table) that includes a set of geopolitical regions along with their vehicle-related regulations (e.g., a set of permitted or disallowed vehicle functions), the vehicle can determine which vehicle functions are permitted for use in the geopolitical region in which it is presently located. Thus, according to numerous embodiments discussed below, the vehicle can be manufactured in a universal manner without regard to the ultimate location in which it will be sold or operated, while still complying with the varying and numerous regulations of different geopolitical regions in which it will or may be operated.

In one embodiment, the vehicle may receive a vehicle command requesting the vehicle to perform a vehicle function. After receiving the vehicle command, the vehicle can determine a present location of the vehicle, resolve the geographical location of the vehicle to a geopolitical region, and then determine whether vehicle functionality associated with the requested vehicle function is permitted for use in that geopolitical region. Thereafter, the vehicle may carry out the requested vehicle function when it is determined that the requested vehicle function is permitted to be performed in the geopolitical region in which the vehicle is located.

In another embodiment, the vehicle can monitor its location periodically and use this information to determine whether the vehicle is located in a particular geopolitical region. When the geopolitical region changes, the vehicle can recall the corresponding set of permitted (or disallowed) vehicle functions for the present geopolitical region in which the vehicle is now located. Then, the vehicle can disable the disallowed vehicle functions for the present geopolitical region and/or enable previously disallowed vehicle functions that are now permitted in the present geopolitical region. Thus, whenever the vehicle receives a command or instruction to perform a vehicle function, the vehicle will not carry out the disabled vehicle functions as to not violate the laws or regulations of the present geopolitical region in which the vehicle is located. Various other embodiments exist, as will be appreciated by those skilled in the art in light of the further detailed discussion below.

Figure 1:
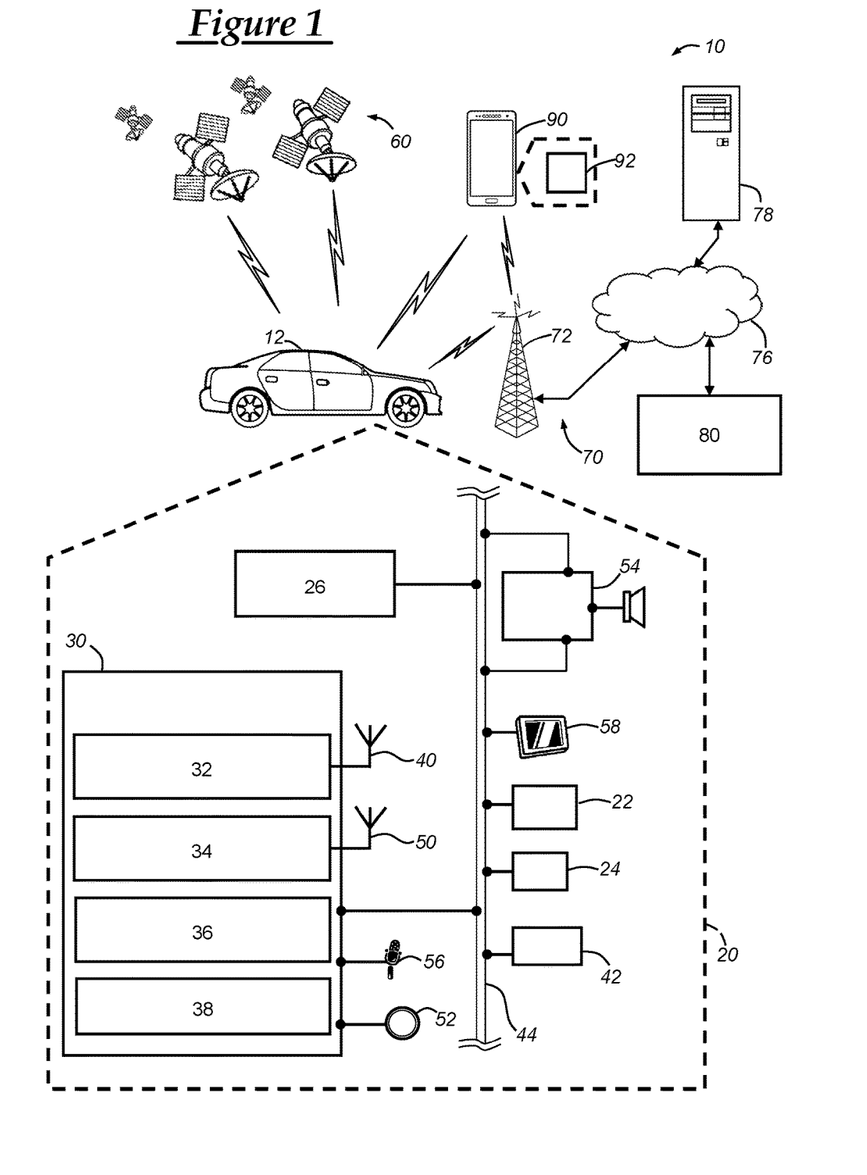
FIG. 1 is a block diagram depicting an embodiment of a communications system that is capable of utilizing the method disclosed herein.

Referring now to FIG. 1, there is shown an operating environment that comprises a communications system 10 and that can be used to implement the method disclosed herein. Communications system 10 generally includes a vehicle 12 with a body control module (BCM) 26 and a wireless communications device 30, a constellation of global navigation satellite system (GNSS) satellites 60, one or more wireless carrier systems 70, a land communications network 76, a computer 78, a remote facility 80, and a personal mobile device 90. It should be understood that the disclosed method can be used with any number of different systems and is not specifically limited to the operating environment shown here. Also, the architecture, construction, setup, and general operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be used for one or more purposes, such as a remote server accessible by vehicle 12. Other such accessible computers 78 can be, for example: a third party server that can be used to provide location services; a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an IP address to the vehicle 12.

As mentioned above, computer 78 can be used to provide location services which can include providing geopolitical region information to the vehicle. In one embodiment, computer 78 may act as a third party server that can be used to provide geopolitical region services. For example, computer 78 can be a third party application programming interface (API) that provides location and geopolitical region information to the vehicle 12, mobile device 90, or remote facility 80. In one particular embodiment, the third party server can include an API that takes geographic location information, such as GNSS coordinates, as input and returns one or more geopolitical regions that govern the inputted geographic location. As described in more detail below, the vehicle can use GNSS module 60 to obtain the geographical coordinates of the vehicle and then the vehicle can provide the geographical coordinates to computer 78 for processing by the third party geopolitical region services API, which can then return one or more geopolitical regions that govern the location corresponding to the geographic locations of the vehicle.

Remote facility 80 may be designed to provide the vehicle electronics 20 and mobile device 90 with a number of different system back-end functions through use of one or more electronic servers. For example, remote facility 80 may be used in part to facilitate or coordinate information sent between vehicle 12 and one or more client devices, such as mobile device 90 or computer 78. A "client device" may be any device that includes a vehicle-device application (such as application 92) that can be used to control the vehicle or at least send vehicle function requests to the vehicle. In one embodiment, the remote facility 80 can provide location services, such as the geopolitical region services described above with respect to computer 78. Additionally, or alternatively, the remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76.

Remote facility 80 can also include one or more databases that can store account information such as subscriber authentication information, vehicle identifiers, profile records, behavioral patterns, geopolitical region information, and other pertinent subscriber information. As used herein, geopolitical region information includes information associating a geopolitical region with a set of vehicle functions and, in certain embodiments, can also include an associated geopolitical region identifier that identifies a particular geopolitical region. In one embodiment, the set of vehicle functions are those vehicle functions that are not permitted to be carried out in the associated geopolitical region. And, in another embodiment, the set of vehicle functions are those vehicle functions that are permitted to be carried out in the associated geopolitical region. In other embodiments, both permitted and disallowed (e.g., not permitted) vehicle functions can be stored at remote facility 80 as part of the geopolitical region information. Geopolitical region information can also be kept at vehicle 12, as will be discussed in more detail below. In such a case, remote facility 80 can be used to update geopolitical region information, including geopolitical region boundary information and/or permitted (or disallowed) vehicle function information. As used herein, geopolitical region boundary information includes information that conveys boundaries of one or more geopolitical regions, including information represented as a set of coordinate points that can be used as vertices in a polygon representing a geopolitical region. Geopolitical region boundary information may be minified and/or consolidated so that it can be used or implemented as an algorithm or function (e.g., a hash function) that takes a geographic location as input and returns a geopolitical region. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

The personal mobile device 90 is a mobile device and may include: hardware, software, and/or firmware enabling cellular telecommunications and SRWC as well as other mobile device applications. As used herein, a personal mobile device is a mobile device that is capable of SRWC, that is portable by a user, and where the portability of the device is at least partly dependent on the user, such as a wearable device (e.g., a smartwatch), an implantable device, or a handheld device (e.g., a smartphone, a tablet, a laptop). As used herein, a short-range wireless communications (SRWC) device is a device capable of SRWC. The hardware of personal mobile device 90 may comprise: a processor and memory (e.g., non-transitory computer readable medium configured to operate with the processor) for storing the software, firmware, etc. The personal mobile device's processor and memory may enable various software applications 92, which may be preinstalled or installed by the user (or manufacturer) (e.g., having a software application or graphical user interface (GUI)).

One implementation of a vehicle-mobile device application 92 may enable a vehicle user to communicate with the vehicle 12 and/or control various aspects or functions of the vehicle, some of which are listed below. For example, the vehicle-mobile device application 92 can include a graphical user interface that allows a user to enter credentials, submit credentials for authorization and/or authentication, connect to vehicle 12, view vehicle status information including geopolitical regions in which the vehicle is located, request vehicle functions to be carried out, and/or configure one or more vehicle settings. Mobile device 90 may communicate with wireless communications device 30 according to one or more SRWC technologies or wired connections, such as a connection using a Universal Serial Bus (USB) cable. Although a single mobile device 90 is shown, communications 10 can include a plurality of mobile devices 90.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a global navigation satellite system (GNSS) module 22, engine control unit (ECU) 24, a body control module (BCM) 26, a wireless communications device 30, other vehicle system modules (VSMs) 42, and numerous other components and devices. Some or all of the different vehicle electronics may be connected for communication with each other via one or more communication busses, such as bus 44. Communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle system modules (VSMs) as part of vehicle electronics 20, such as the GNSS module 22, ECU 24, BCM 26, wireless communications device 30, and vehicle user interfaces 52-58, as will be described in detail below. The vehicle 12 can also include other VSMs 42 in the form of electronic hardware components that are located throughout the vehicle and, which may receive input from one or more sensors and use the sensed input to perform diagnostic, monitoring, control, reporting, and/or other functions. Each of the VSMs 42 is preferably connected by communications bus 44 to the other VSMs, as well as to the wireless communications device 30, and can be programmed to run vehicle system and subsystem diagnostic tests. One or more VSMs 42 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Global navigation satellite system (GNSS) module 22 receives radio signals from a constellation of GNSS satellites. In one embodiment, the GNSS module 22 may be a global positioning system (GPS) module, which may receive GPS signals from a constellation of GPS satellites 60. From these signals, the module 22 can determine vehicle position which may enable the vehicle to determine whether it is at a known location, such as home or workplace. Moreover, GNSS module 22 can provide this location data (e.g., geographical coordinates) to wireless communications device 30, which can then use this data to identify known locations, such as a vehicle operator's home or workplace. Additionally, GNSS module 22 may be used to provide navigation and other position-related services to the vehicle operator. Navigation information can be presented on the display 58 (or other display within the vehicle) or can be presented verbally such as is done when supplying turn-by-turn navigation. The navigation services can be provided using a dedicated in-vehicle navigation module (which can be part of GNSS module 22), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The location information can be supplied to remote facility 80 or other remote computer system, such as computer 78, for other purposes, such as fleet management and/or for use in a car sharing service. Also, new or updated map data can be downloaded to the GNSS module 22 from the remote facility 80 via a vehicle telematics unit.

Vehicle electronics 20 also includes a number of vehicle user interfaces that provide vehicle occupants with a means of providing and/or receiving information, including pushbutton(s) 52, audio system 54, microphone 56, and visual display 58. As used herein, the term "vehicle user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, or control input. Audio system 54 provides audio output to a vehicle occupant and can be a dedicated, stand-alone system or part of the primary vehicle audio system. According to the particular embodiment shown here, audio system 54 is operatively coupled to both vehicle bus 44 and an entertainment bus (not shown) and can provide AM, FM and satellite radio, CD, DVD and other multimedia functionality. This functionality can be provided in conjunction with or independent of an infotainment module. Microphone 56 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 58 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Body control module (BCM) 26 is shown in the exemplary embodiment of FIG. 1 as being electrically coupled to communication bus 44. In some embodiments, the BCM 26 may be integrated with or part of a center stack module (CSM) and/or integrated with wireless communications device 30. Or, the BCM and CSM may be separate devices that are connected to one another via bus 44. In one particular embodiment, BCM 26 may be isolated and connected to the wireless communications device 30 and select VSMs on an isolated portion of the bus 44, or connected to the wireless communications device 30 and select VSMs via a separate communications bus. BCM 26 can include a processor and/or memory, which can be similar to processor 36 and memory 38 of wireless communications device 30, as discussed below. BCM 26 may communicate with wireless communications device 30 and/or one or more vehicle system modules, such as GNSS 22, audio system 54, or other VSMs 42. BCM may include a processor and memory such that the BCM may direct one or more vehicle operations including, for example, controlling central locking, air conditioning, power mirrors, controlling the vehicle ignition or primary mover (e.g., engine, primary propulsion system), and/or controlling various other vehicle modules. BCM 26 may receive data from wireless communications device 30 and, subsequently, send the data to one or more vehicle modules.

Additionally, BCM 26 may provide information corresponding to the vehicle state or of certain vehicle components or systems. For example, the BCM may provide the wireless communications device 30 with information indicating whether the vehicle's ignition is turned on, the gear the vehicle is presently in (i.e. gear state), and/or other information regarding the vehicle. Further, the wireless communications device 30 may provide the BCM 26 with information. For example, BCM 26 may receive a notification or indication from wireless communications device 30 that a certain wireless service is available (e.g., a wireless network connection is available) and/or that a SRWC connection has been established with a SRWC device, such as mobile device 90. In one particular embodiment, the BCM 26 may include one or more certificates or encryption keys that can be used to authenticate one or more vehicle devices or other devices (e.g., mobile device 90) and/or that can be used to communicate information securely.

Wireless communications device 30 is capable of communicating data via short-range wireless communications (SRWC) and, in some embodiments, may be capable of communicating data via cellular network communications. As shown in the exemplary embodiment of FIG. 1, wireless communications device 30 includes an SRWC circuit 32, a cellular chipset 34, a processor 36, memory 38, and antennas 40 and 50. In some embodiments, the wireless communications device 30 may be specifically configured to carry out at least part of the method disclosed herein. In one embodiment, wireless communications device 30 may be a stand-alone module or, in other embodiments, device 30 may be incorporated or included as a part of one or more other vehicle system modules, such as a center stack module (CSM), BCM 26, an infotainment module, a telematics unit, a head unit, and/or a gateway module. In some embodiments, the device 30 can be implemented as an OEM-installed (embedded) or aftermarket device that is installed in the vehicle.

Wireless communications device 30 can be configured to communicate wirelessly according to one or more wireless protocols, including short-range wireless communications (SRWC) such as any of the IEEE 802.11 protocols, Wi-Fi™, WiMAX™, ZigBee™, Wi-Fi Direct™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication circuit 32 enables the wireless communications device 30 to transmit and receive SRWC signals, such as BLE signals. The SRWC circuit may allow the device 30 to connect to another SRWC device. Additionally, in some embodiments, the wireless communications device may contain a cellular chipset 34 thereby allowing the device to communicate via one or more cellular protocols, such as those used by cellular carrier system 70.

Wireless communications device 30 may enable vehicle 12 to be in communication with one or more remote networks via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art. It should be appreciated that mobile device 90 can include a cellular chipset and/or other communicating means that can be used for packet-switched data communications.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, at least in one embodiment, processor 36 can execute programs or process data to carry out at least a part of the method discussed herein. Memory 38 may include RAM, other temporary powered memory, any non-transitory computer-readable medium (e.g., EEPROM), or any other electronic computer medium that stores some or all of the software needed to carry out the various external device functions discussed herein.

In one embodiment, the wireless communications device 30 may operate both when the vehicle is in a powered on state and when the vehicle is in a powered off state. As used herein, a "powered on state" is a state of the vehicle in which the ignition or primary propulsion system of the vehicle is powered on and, as used herein, a "powered off state" is a state of the vehicle in which the ignition or primary propulsion system of the vehicle is not powered on. The operation or state of the wireless communications device 30 may be controlled by another vehicle system module, such as by BCM 26 or by an infotainment module. In the powered on state, the wireless communications device 30 may always be kept "on" or supplied with power from a vehicle battery or other power source. In the powered off state, the wireless communications device 30 may be kept in a low-power mode or may be supplied power periodically so that device 30 may wake up and perform operations.

The vehicle may use the wireless communications device 30 to connect to other SRWC devices, such as personal mobile device 90. A connection between the wireless communications device 30 and one or more devices 90 may allow for the operation of various vehicle-device functionality through use of the device's vehicle-device application 92. Vehicle-device functionality (or function) refers to any function of the vehicle that may be complimented, improved, supported, or carried out through a mobile device; any function of the mobile device that may be complimented, improved, supported, or carried out through the vehicle; or any other function that may be carried out using the vehicle and one or more mobile devices. For example, vehicle-device functionality can include using the mobile device 90 to provide the vehicle with a contact list that may be displayed on visual display 58, audio/visual media content to be played via speakers 54 or display 58, navigational information (e.g., start and/or end locations), and/or vehicle commands or instructions that direct the vehicle to perform some operation. Other examples of vehicle-device functionality include using the vehicle electronics to provide the personal mobile device with hands-free calling, such as through use of vehicle-user interfaces to place, receive, and carry out voice calls; sending information to the personal mobile device, such as geographical information to the mobile device 90 (such as information obtained from the GNSS module 22) or vehicle diagnostic information or codes; and carrying out commands (e.g., commands to perform certain vehicle functions) received at the vehicle from the personal mobile device.

A vehicle function is any function or operation that may be performed by the vehicle, including initiating or booting a VSM, unlocking or locking the vehicle doors via the BCM, starting the ignition or primary propulsion system (i.e., primary mover) of the vehicle (i.e., a vehicle ignition start function), disabling/enabling the vehicle ignition or primary propulsion system, heating or cooling passenger seats included in the vehicle, performing air conditioning or heating of the vehicle cabin, turning off/on or flashing headlights or other lights included in the vehicle, emitting an audible sound using a vehicle horn or speakers (such as those included in audio system 54), downloading information (e.g., information pertaining to a car sharing service reservation) or content data (e.g., audio/video playlists or files) from a remote facility 80 or computer 78 (including information that may be particular to the user of the SRWC device and/or associated with the SRWC device), downloading or uploading information (e.g., location information) and/or content data from or to the SRWC device, and/or performing various other operations or functions of the vehicle, many of which are described herein.

In some scenarios, the user may desire to control certain vehicle functionality through use of vehicle-device application 92 on device 90. In such a case, the vehicle may receive a vehicle function request (or vehicle command request). The vehicle function request can be sent to the vehicle via cellular carrier system 70. Or, the vehicle function request may be first sent from vehicle-device application 92 to remote facility 80 and, thereafter, to vehicle 12. The remote facility 80 may authenticate information in the vehicle function request, authorize the vehicle function request, and/or otherwise process the vehicle function request.

In one particular embodiment, the vehicle 12 may continuously or periodically receive GNSS data from the constellation of GNSS satellites 60 at GNSS module 22. After using GNSS module 22 to calculate geographical coordinates of the vehicle (or otherwise determine vehicle location), the wireless communications device 30 can report the geographical coordinates to the remote facility 80. The remote facility 80 can use the geographical coordinates of the vehicle to determine a geopolitical region in which the vehicle is located by comparing the geographical coordinates to geopolitical region boundary information that is kept in a geopolitical region information database. The geopolitical region information database can include one or more sets of vehicle functions that are associated with the certain geopolitical regions. The remote facility 80 can use the received vehicle coordinates to determine which vehicle functions the vehicle may presently carry out without violating laws or regulations of the geopolitical region in which it is located. Thus, when a vehicle function request is received from mobile device 90, the remote facility 80 can determine whether one or more requested vehicle functions included in the vehicle function request are permitted to be carried out in the geopolitical region in which the vehicle is presently located. When it is determined that the one or more vehicle functions are permitted to be carried out in the geopolitical region in which the vehicle is presently located, then the remote facility 80 can forward the vehicle function request to the vehicle. Otherwise, the remote facility 80 can determine not to forward the vehicle function request (i.e., deny the vehicle function request), or can forward the request with only those permitted vehicle functions for the present geopolitical region. The remote facility 80 can then send a notification message to mobile device 90 and/or vehicle 12. The notification message can indicate that the vehicle function request was sent to vehicle 12 and/or was denied by remote facility 80.

In other embodiments, the vehicle may receive a vehicle function request from a mobile device 90 via cellular carrier system 70. Vehicle 12 may then determine a present geopolitical region (i.e., a geopolitical region in which the vehicle is presently located in) using, for example, geographical coordinates that are determined using GNSS module 22. The vehicle can then query a memory device, such as memory 38, for geopolitical region information that can include which vehicle functions are permitted or disallowed in the present geopolitical region. This geopolitical region information can be kept in a lookup table that is stored in memory 38 and that associates geopolitical region boundary information with permitted or disallowed vehicle functions. In one particular embodiment, the vehicle 12 can query the geopolitical region information lookup table using the geographical coordinates from GNSS module 22 to retrieve a set of vehicle functions that include permitted vehicle functions or disallowed vehicle functions. Thereafter, vehicle 12 can compare the requested vehicle function to the retrieved set of vehicle functions to determine whether the requested vehicle function is permitted to be carried out in the present geopolitical region.

Figure 2:
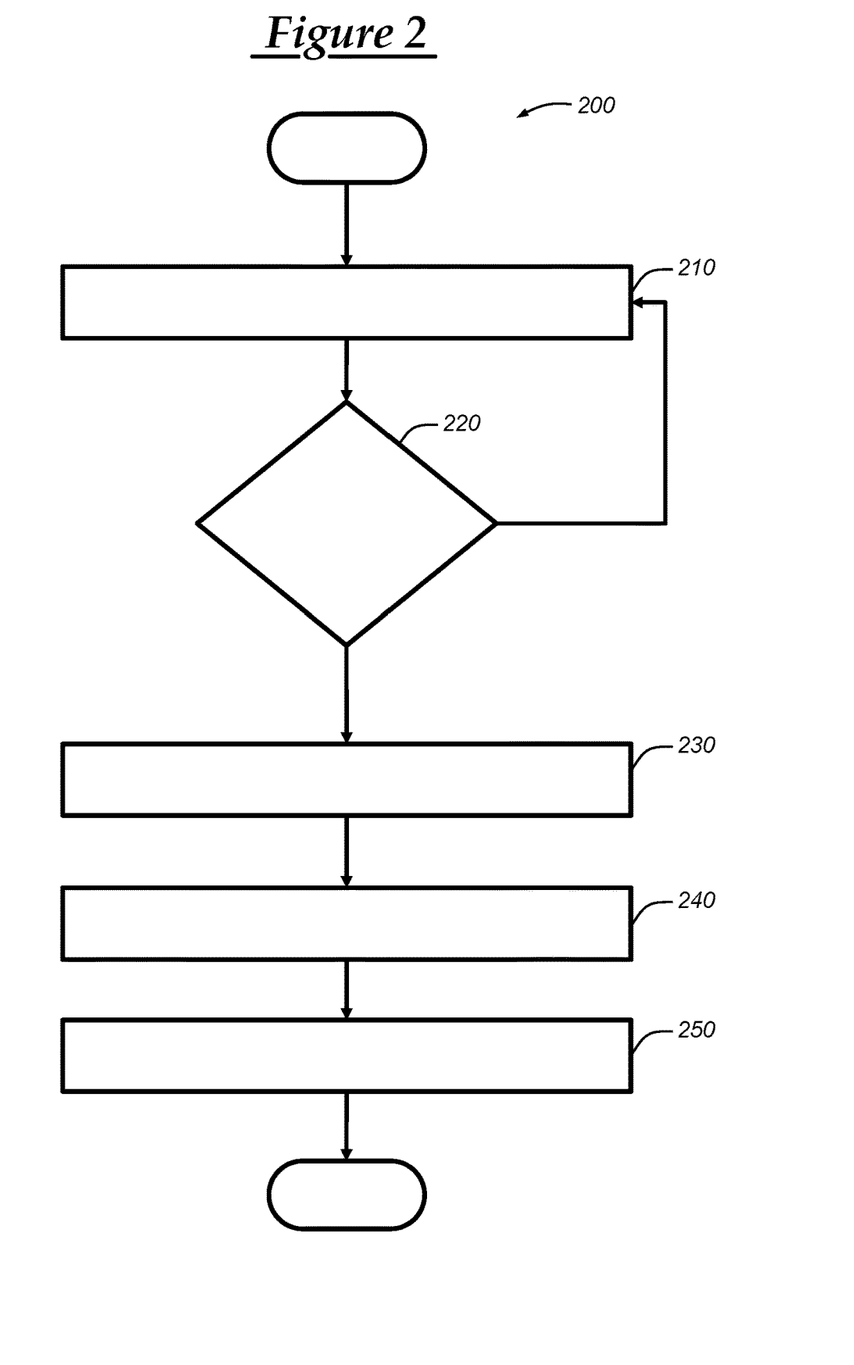
FIG. 2 is a flowchart illustrating a method of controlling vehicle functionality based on a geopolitical region of the vehicle.

With reference to FIG. 2, there is shown an embodiment of a method 200 of controlling various vehicle functionality based on a geopolitical region of the vehicle. The method 200 can be carried out by vehicle 12 or, in other embodiments, method 200 may be carried by a remote facility or server, such as remote facility 80. Various steps of method 200 may be carried out by one or more of the following: vehicle 12, mobile device 90, remote facility 80, and/or computer 78. As mentioned above, the geopolitical region of the vehicle can include laws or regulations that, at least in effect, prohibit the carrying out of at least one vehicle function. For example, a law or regulation prohibiting the idling of a vehicle when an operator is not present has the effect to disallowing a remote vehicle ignition start function that acts to start a vehicle ignition remotely, even though it is possible that another operator is in the presence of the vehicle. However, the remote vehicle ignition start function would still be considered disallowed or not permitted since, there is a fairly likely probability that performing such function can have the effect of violating a law or regulation of the geopolitical region. Moreover, some geographical areas may be governed by numerous governing bodies, such as a state government and a federal government, and, thus, the vehicle may be located in one or more geopolitical region at a single given moment.

Method 200 begins with step 210, wherein the geopolitical region of the vehicle is monitored. Generally, this can include periodically determining a geographical location of the vehicle and resolving the geographical location of the vehicle to a geopolitical region in which the vehicle is located. In one embodiment, the vehicle may periodically receive GNSS signals from the constellation of GNSS satellites 60 and determine the geographical coordinates (e.g., GNSS coordinates including GPS coordinates) of the vehicle 12. Thereafter, one or more geopolitical regions in which the vehicle is located can be determined. In one embodiment, the geographical coordinates can be sent to wireless communications device 30 via bus 44. The wireless communications device 30 can then use the coordinates to query a geopolitical region lookup table that includes geopolitical boundary information, as well as associated vehicle functions. By using certain techniques known to those skilled in the art, such as point-in-polygon algorithms and methods including ray casting and/or winding number algorithms, the vehicle can determine whether the geographical coordinate is located within the boundary of a particular geopolitical region.

For example, the present geopolitical region can be resolved by: (i) obtaining geopolitical region boundary information that comprises a set of coordinates representing a geographical boundary of a first geopolitical region; (ii) using the obtained geopolitical region boundary information and the geographical coordinates of the vehicle in conjunction with a point-in-polygon algorithm or method to determine whether the vehicle is located within the first geopolitical region; and (iii) when it is determined that the vehicle is not located within the first geopolitical region, then carrying out (i)-(ii) until it is determined that the vehicle is located within the first geopolitical region. The point-in-polygon algorithm or method can include a ray casting algorithm or method, a winding number algorithm or method, or other algorithms or methods that can be used to determine whether a particular two-dimensional point is included in a two-dimensional polygon.

In another embodiment, location information of the vehicle including geographical coordinates can be sent automatically to remote facility 80 or a third party server that provides geopolitical region services, which can be, for example, computer 78. In a particular embodiment, the geographical location information can be sent to the remote facility regardless whether the vehicle is located within the same geopolitical region as the remote facility and/or regardless of whether the vehicle is aware of whether it is located within the same geopolitical region as the remote facility. The remote facility 80 or computer 78 can use the location information to determine the geopolitical region in which the vehicle is located. This can include use of known techniques as discussed above, including ray casting algorithms and/or methods, as well as winding number and crossing number algorithms and/or methods. Once the remote facility 80 or computer 78 determines the geopolitical region of the vehicle, then a geopolitical region resolve message that includes the present geopolitical region may be sent to the vehicle 12. In another embodiment, the remote facility 80 may determine whether the geopolitical region has changed through keeping track of previously determined geopolitical regions and comparing the present geopolitical region to these previously determined geopolitical regions (step 220) and, if so, the remote facility 80 can obtain a new set of vehicle functions and send the set of vehicle functions to vehicle 12 (step 230). The method 200 proceeds to step 220.

In step 220, it can be determined whether the present geopolitical region has changed. For example, each time the geopolitical region is determined, it may be stored in memory, such as in a database at vehicle 12 or at remote facility 80. Then, upon determining new geopolitical regions that correspond to the vehicle's location, the previous geopolitical region may be recalled and compared with the present geopolitical region. If it is determined that the geopolitical region has changed, then the previous geopolitical region may be set to the present geopolitical region and the method 200 may continue to step 230; otherwise, the method 200 can continue to step 210 wherein the geopolitical region is further monitored.

In step 230, a set of vehicle functions are obtained. The set of vehicle functions can be a set of vehicle functions that are not permitted to be carried out in the present geopolitical region according to the laws and/or regulations of the present geopolitical region. Or, the set of vehicle functions can be a set of vehicle functions that are permitted to be carried out in the present geopolitical region according to the laws and/or regulations of the present geopolitical region. According to various embodiments, the vehicle 12 may obtain the set of vehicle functions. Or, in other embodiments, the remote facility 80 can obtain or determine the set of vehicle functions. Other embodiments exists, such as where both the vehicle 12 and the remote facility obtain the set of vehicle functions.

The set of vehicle functions can be referred to as permitted vehicle function information and can be included as part of geopolitical region information that is obtained through querying a geopolitical region information database using the present geopolitical region. For example, the geopolitical region information database can include a list of geopolitical regions (e.g., which may be represented by geopolitical region identifiers), each of which is associated with a set of vehicle functions and/or geopolitical region boundary information that identifies the geographical boundaries of the geopolitical region. In other embodiments, this geopolitical region information can be kept in a data file that is stored in a non-transitory computer-readable memory, such as an EEPROM or other memory device, including those discussed above with respect to memory 38. Once the set of vehicle functions are obtained, the remote facility 80 or vehicle 12 can be aware of which vehicle functions are permitted or disallowed in the present geopolitical region and can operate accordingly. The method 200 continues to step 240.

In step 240, the system disables or prevents carrying out the vehicle functions that are not permitted to be carried out in the present geopolitical region. This may include setting a flag in a database or memory that represents which vehicle functions are presently permitted. Or, in other embodiments, in response to receiving a vehicle function request, the remote facility 80 or vehicle 12 can determine whether the vehicle function request is permitted to be carried out by carrying out steps 210-230 (see also method 300 of FIG. 3). In one embodiment, wherein the method is at least partly carried out at the remote facility 80, the remote facility 80 can filter vehicle function requests received from various devices by preventing such vehicle function requests from being delivered to vehicle 12. For example, a first geopolitical region may have regulations that do not allow vehicle ignitions to be started without an operator present. Thus, the remote facility 80 may inspect vehicle function requests that are intended for vehicle 12. When it is determined, upon inspection, that a vehicle function request includes a command or request to start a vehicle's ignition (e.g., remote vehicle start), then the remote facility 80 may determine to not forward the vehicle function request to vehicle 12. The remote facility 80 can then notify the client device that generated and/or sent the vehicle function request.

In another embodiment, the vehicle 12 may receive the vehicle function request without being filtered by remote facility 80. In such an embodiment, the vehicle 12 can set one or more flags in a memory device, such as memory 38 or a memory device in BCM 26, to indicate that the certain vehicle functions are presently disabled. The method 200 continues to step 250.

In step 250, the vehicle can enable certain vehicle functions that are permitted for use in the present geopolitical region. This can include setting one or more vehicle function enabled flags in a memory device, such as a memory device of a server or computer located at remote facility 80 or a memory device of the vehicle including memory 38 or a memory device in BCM 26. The vehicle function enabled flags can be used to indicate certain vehicle functions that are presently enabled (or permitted). Thus, when a vehicle function request is received, the vehicle function enabled flags can be used to determine whether the requested vehicle function should be carried out. In other embodiments, method steps 240 and 250 can be carried out in a different order or at the same time. In one embodiment, the remote facility can send a disable/enable vehicle function message to the vehicle, wherein the disable/enable vehicle function message specifies at least one vehicle function that is to be disabled or enabled. The method 200 then ends.

Figure 3:
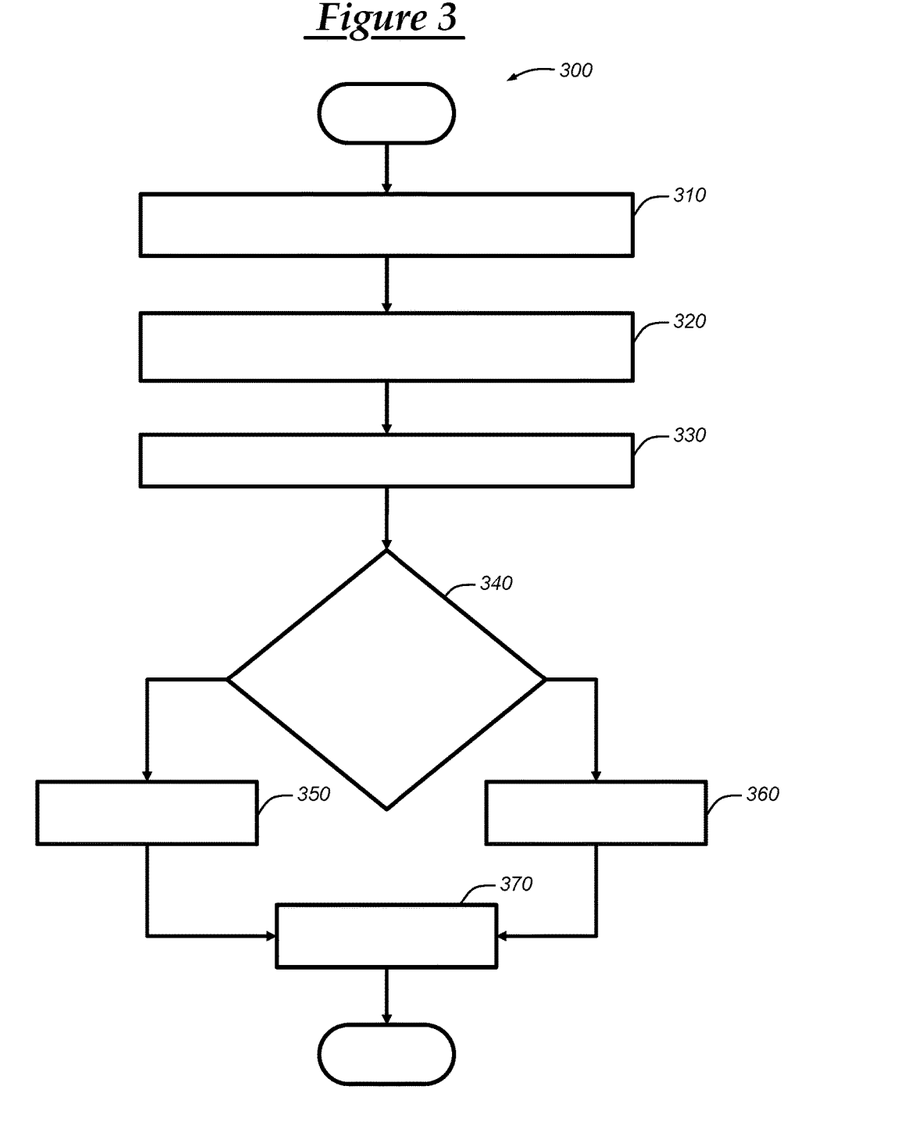
FIG. 3 is a flowchart illustrating another embodiment of a method of controlling vehicle functionality based on a geopolitical region of the vehicle.

With reference to FIG. 3, there is shown an embodiment of a method 300 of controlling various vehicle functionality based on a geopolitical region of the vehicle. The method 300 can be carried out by vehicle 12 or, in other embodiments, method 300 may be carried by a remote facility or server, such as remote facility 80. Various steps of method 300 may be carried out by one or more of the following: vehicle 12, mobile device 90, remote facility 80, and/or computer 78.

Method 300 begins with step 310, wherein the location of vehicle is determined. As mentioned above, the vehicle 12 can use GNSS module 22 to determine the vehicle location through receiving a plurality of GNSS signals from a constellation of GNSS satellites 60. In other embodiments, vehicle location can be determined through triangulation techniques for use with cellular carrier system 70 or through using other location services techniques such as through using network-enabled geolocation techniques. The method 300 continues to step 320.

In step 320, a set of vehicle functions that are associated with a geopolitical region are obtained or retrieved. The set of vehicle functions can be a set of vehicle functions that are not permitted to be carried out in the present geopolitical region according to the laws and/or regulations of the present geopolitical region. Or, the set of vehicle functions can be a set of vehicle functions that are permitted to be carried out in the present geopolitical region according to the laws and/or regulations of the present geopolitical region. According to various embodiments, the vehicle 12 may obtain the set of vehicle functions. Or, in other embodiments, the remote facility 80 can obtain or determine the set of vehicle functions. Other embodiments exists, such as where both the vehicle 12 and the remote facility obtain the set of vehicle functions.

The set of vehicle functions can be obtained through querying a geopolitical region information database using the present geographical coordinates. For example, the geopolitical region information database can include a list of geopolitical regions, each of which is associated with a geopolitical region boundary information and a set of vehicle functions. In other embodiments, this geopolitical region information can be kept in a data file that is in a non-transitory computer-readable memory, such as an EEPROM or other memory device, including those discussed above with respect to memory 38. The set of vehicle functions can be obtained through using the geographical coordinates and the geopolitical region boundary information according to certain techniques known to those skilled in the art, as discussed above. The method 300 continues to step 330.

In step 330, a vehicle function request is received. Depending on the particular embodiment, the vehicle 12 or the remote facility 80 can receive the vehicle function. For example, in the scenario where the remote facility 80 is used to filter vehicle function requests, the remote facility 80 may receive the vehicle function request from a mobile device 90 or other client device, such as a desktop computer 78. Or, the vehicle function request can be received at the vehicle from the mobile device 90 or other device, such as a desktop computer 78. The vehicle function request may be decrypted using one or more keys, which can be established through a handshaking process with mobile device 90 or desktop computer 78. The vehicle function request can be verified and/or authenticated when received. In other embodiments, the vehicle function request may carry entitlement information that, upon verifying the entitlement information, automatically indicates that the vehicle function request is from an authenticated device, as well as indicating that the function request is authorized. Thereafter, one or more requested vehicle functions may be obtained from the vehicle function request.

In other embodiments, an indication that an imminent vehicle function is to be performed can be obtained or received. The indication of the imminent vehicle function can be based on a particular vehicle state that indicates the imminent vehicle function is to be or is likely to be carried out. For example, when the vehicle ignition is started, a location tracking vehicle function (i.e., sending vehicle location information to a remote facility) may be automatically triggered soon thereafter and, thus, the location tracking vehicle function may be considered an imminent vehicle function, which can be prevented when it is determined that the location tracking vehicle function is not permitted in the present geopolitical region of the vehicle. The method 300 continues to step 340.

In step 340, it is determined whether the requested vehicle function is permitted to be carried out in the present geopolitical region. As mentioned above, the method may be used with an imminent vehicle function instead or in addition to a requested vehicle function and, for the purposes of method 300, the requested vehicle function may also include an imminent vehicle function. The determination can be performed by comparing the requested vehicle function to the functions included in the set of vehicle functions that was retrieved in step 320. This step can be carried out by a processing device included at remote facility 80 or in vehicle 12, such as processing device 36 or a processing device included in BCM 26. When it is determined that the requested vehicle function is permitted (e.g., the requested vehicle function corresponds to a vehicle function included in a set of permitted vehicle functions), then the method 300 continues to step 360, wherein the vehicle function is carried out. Otherwise, the method 300 continues to step 350.

In step 350, the vehicle function is not carried out. In other embodiments, such as when a vehicle function is expected to automatically be carried out by the vehicle, which may be realized through analyzing the present vehicle state, the vehicle function can be prevented from being carried out. This can include informing the BCM 26 or other VSM to not carry out such vehicle function. In other embodiments where the remote facility 80 filters vehicle function requests, the remote facility 80 can determine to not forward the vehicle function request to the vehicle 12, or may remove the disallowed vehicle functions included in the received vehicle function request and then forward the modified vehicle function request to the vehicle 12. The method 300 then continues to step 370.

In step 360, the vehicle function is carried out. For example, the vehicle can send the vehicle function request or other information derived therefrom to the appropriate VSM included in the vehicle. In one example, the requested vehicle function can be starting the vehicle ignition. Thus, a vehicle ignition start command can be sent to BCM 26, which can then carry out certain steps as to carry out the vehicle ignition start command, such as sending certain messages or instructions to the engine control unit (ECU) 24.

In some embodiments, the vehicle function request can include a plurality of requested vehicle functions and, thus, steps 340-360 can be carried out for each requested vehicle function. In one particular embodiment, when one or more of the requested vehicle functions is not permitted, then the entire vehicle function request may be ignored and, thus, none of the requested vehicle functions may be carried out. Moreover, if certain requested vehicle functions require (or desire) a particular vehicle state as a prerequisite for carrying out the requested vehicle function, then the vehicle may determine to not carry out the requested vehicle function if the vehicle is not in the particular vehicle state. For example, if a user sends a vehicle function request that includes a vehicle ignition start function request (a first requested vehicle function) and a vehicle heat system initiate function request, which is a command or request to initiate the vehicle's heating system, (a second requested vehicle function) and, pursuant to steps 310 to 340, it is determined that the vehicle ignition start function is not permitted, then the vehicle or remote facility may additionally choose to not carry out the vehicle heat system initiate function, even though the vehicle heat system initiate function may be permitted in the present geopolitical region. The method 300 continues to step 370.

In step 370, the client device that issued the vehicle function request can be notified. The notification can include sending a notification message to the client device indicating whether the one or more requested vehicle functions were carried out. This notification message can be received by mobile device 90, for example, and, through use of vehicle-device application 92, can be presented to the user using a graphical user interface that is presented on a display of the mobile device 90. Or, the notification message can be sent to the vehicle and/or presented on a display 58 of vehicle 12. The method 300 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of controlling vehicle functionality based on a geopolitical region of the vehicle, wherein the method is carried out by a remote facility, and wherein the method comprises the steps of:
    monitoring a geographical location of the vehicle at the remote facility by receiving the geographical location of the vehicle from the vehicle via a remote connection between the vehicle and the remote facility;
    resolving the geographical location of the vehicle to a geopolitical region in which the vehicle is located;
    obtaining permitted vehicle function information for the geopolitical region in which the vehicle is located, wherein the permitted vehicle function information is obtained from a geopolitical region information database that includes geopolitical region information associated with a set of vehicle functions, and wherein the geopolitical region information includes a geopolitical region identifier and geopolitical region boundary information that identifies the geographical boundaries of the geopolitical region;
    receiving a vehicle function request from a client device at the remote facility, wherein the client device is located remotely from the remote facility;
    obtaining a requested vehicle function from the vehicle function request;
    determining whether the requested vehicle function is permitted to be carried out by the vehicle based on the obtained permitted vehicle function information for the geopolitical region in which the vehicle is located; and
    when the requested vehicle function is permitted to be carried out, then sending an indication to carry out the requested vehicle function to the vehicle from the remote facility so that the requested vehicle function is carried out by the vehicle in response to receiving the indication.

2. The method of claim 1, further comprising the steps of:
    determining not to send the indication to carry out the requested vehicle function to the vehicle; and
    notifying the client device that the requested vehicle function is not going to be and/or was not carried out.

3. The method of claim 1, wherein the resolving step further includes obtaining the geopolitical region boundary information from the geopolitical region information database and using the geopolitical region boundary information along with the geographical location to determine the geopolitical region in which the vehicle is located.

4. A method of controlling vehicle functionality based on a geopolitical region of the vehicle, wherein the method is carried out by a remote facility, and wherein the method comprises the steps of:
    receiving a geographical location of the vehicle from the vehicle at the remote facility, wherein the geographical location of the vehicle is determined at the vehicle based on a plurality of global navigation satellite system (GNSS) signals received at a GNSS module of the vehicle from a constellation of GNSS satellites, and wherein the geographical location corresponds to a geopolitical region;
    at the remote facility, obtaining a set of vehicle functions that are permitted or not permitted to be carried out in the geopolitical region;
    receiving a vehicle function request to perform a requested vehicle function, wherein the vehicle function request is sent from a vehicle-device application of a client device to the remote facility, wherein the vehicle-device application enables a user of the vehicle-device application to control various functions of the vehicle, and wherein the requested vehicle function is a vehicle ignition start function;
    at the remote facility, determining whether the vehicle function is permitted or not permitted to be carried out in the geopolitical region in which the vehicle is located by determining whether the requested vehicle function corresponds to one of the vehicle functions included in the set of vehicle functions; and
    permitting the vehicle function to be performed by communicating the requested vehicle function to the vehicle from the remote facility when it is determined that the vehicle function is permitted to be carried out in the geopolitical region in which the vehicle is located.

5. The method of claim 4, wherein the geopolitical region includes laws or regulations that, at least in effect, prohibit the carrying out of at least one vehicle function.

6. The method of claim 4, wherein the vehicle includes geopolitical region information that is stored in a memory device at the remote facility, wherein the geopolitical region information includes geopolitical region boundary information that is associated with the set of vehicle functions.

7. The method of claim 4, wherein the vehicle function request includes a plurality of requested vehicle functions, wherein the vehicle function is a first one of the plurality of vehicle functions, and wherein the performing step is prevented from being carried out when it is determined that: (i) a second one of the plurality of requested vehicle functions is not permitted to be carried out in the geopolitical region in which the vehicle is located; and (ii) carrying out of the second vehicle function causes the vehicle to enter a vehicle state that is either required or desired as a precondition for carrying out the first vehicle function.

8. A method of controlling vehicle functionality based on a geopolitical region of the vehicle, wherein the method is carried out by a remote facility, and wherein the method comprises the steps of:
    receiving a geographical location of the vehicle from the vehicle via a remote connection between the vehicle and the remote facility, wherein the geographical location of the vehicle is determined through using a global navigation satellite system (GNSS) module that is included in vehicle electronics of the vehicle, wherein the GNSS module is configured to receive a plurality of GNSS signals from a constellation of GNSS satellites and to determine geographical coordinates based on the plurality of received GNSS signals, and wherein the geographical location includes the geographical coordinates;
    resolving the geographical location of the vehicle to a present geopolitical region in which the vehicle is located at the remote facility, wherein the resolving step includes:

(i) obtaining geopolitical region boundary information that comprises a set of coordinates representing a geographical boundary of a first geopolitical region;

(ii) using the obtained geopolitical region boundary information and the geographical coordinates of the vehicle in conjunction with a point-in-polygon algorithm or method to determine whether the vehicle is located within the first geopolitical region; and (iii) when it is determined that the vehicle is not located within the first geopolitical region, then carrying out (i)-(ii) for a new geopolitical region as the first geopolitical region until it is determined that the vehicle is located within the first geopolitical region;

obtaining permitted vehicle function information for the present geopolitical region of the vehicle at the remote facility;

receiving, at the remote facility, a vehicle function request to perform a requested vehicle function, wherein the vehicle function request is received from a client device that includes a vehicle-device application that permits a user of the vehicle-device application to control various functions of the vehicle;

at the remote facility, determining whether the requested vehicle function is permitted to be carried out in the present geopolitical region;

when it is determined that the requested vehicle function is permitted to be carried out in the present geopolitical region, sending an indication to carry out the requested vehicle function from the remote facility to the vehicle; and when it is determined that the requested vehicle function is not permitted to be carried out in the present geopolitical region, then denying the vehicle function request.

9. The method of claim 8, wherein the resolving step includes automatically sending the geographical location to a remote facility and wherein the remote facility is configured to send geopolitical region information including an indication of the present geopolitical region.

10. The method of claim 9, wherein the geographical location is automatically sent to the remote facility regardless whether the vehicle is located within the same geopolitical region as the remote facility.

* * * * *